US012761723B2

(12) United States Patent
Smoot et al.

(10) Patent No.: US 12,761,723 B2
(45) Date of Patent: Oct. 13, 2026

(54) MODULAR OMNIDIRECTIONAL ACTUATED FLOORS PROVIDING A RECONFIGURABLE VIDEO PRODUCTION ENVIRONMENT

(71) Applicant: DISNEY ENTERPRISES, INC., Burbank, CA (US)

(72) Inventors: Lanny S. Smoot, Thousand Oaks, CA (US); Frank D. Mezzatesta, III, Glendale, CA (US); Jack Wetherell, Burbank, CA (US); Robert J. Bristow, Shadow Hills, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 18/782,381

(22) Filed: Jul. 24, 2024

(65) Prior Publication Data

US 2026/0029838 A1 Jan. 29, 2026

(51) Int. Cl.
*G06F 3/01* (2006.01)
*H04N 23/61* (2023.01)
*H04N 23/90* (2023.01)

(52) U.S. Cl.
CPC ............ *G06F 3/011* (2013.01); *H04N 23/61* (2023.01); *G06F 2203/012* (2013.01)

(58) Field of Classification Search
None
See application file for complete search history.

(56) References Cited

U.S. PATENT DOCUMENTS

| | | | |
|---|---|---|---|
| 6,152,854 | A | 11/2000 | Carmein |
| 10,416,754 | B2 | 9/2019 | Smoot et al. |
| 10,732,197 | B2 | 8/2020 | Smoot et al. |
| 11,132,837 | B2 | 9/2021 | Cordes et al. |

(Continued)

FOREIGN PATENT DOCUMENTS

| | | | |
|---|---|---|---|
| WO | 2022198028 | A1 | 9/2022 |
| WO | 2022212761 | A1 | 10/2022 |
| WO | 2025251089 | A1 | 12/2025 |

OTHER PUBLICATIONS

U.S. Appl. No. 18/376,930 entitled "Systems and Methods to Simulate the Movement and Interaction of Objects on Modular Omnidirectional Actuated Floors" filed Oct. 5, 2023, 37 pages.

(Continued)

*Primary Examiner* — Hung Q Dang
(74) *Attorney, Agent, or Firm* — Dorsey & Whitney LLP

(57) ABSTRACT

A video production system may include a video production environment and a modular floor including a plurality of tiles configured to move independently to induce or respond to a motion for a user or users in contact with the modular floor. The video production environment may include a camera, a stage, and a screen. The screen may provide a digital background. The system may include a processor configured to modify a configuration of the video production environment (e.g., the digital environment or the physical environment) based on a detected characteristic of the user(s) on the modular floor (e.g., an orientation, position, or movement of the user(s)). The system may include a sensor configured to detect the characteristic of the user(s) on the modular floor. Additional systems and associated methods are also disclosed.

18 Claims, 9 Drawing Sheets

(56) References Cited

U.S. PATENT DOCUMENTS

| | | | | |
|---|---|---|---|---|
| 11,132,838 | B2 | 9/2021 | Cordes et al. | |
| 11,727,644 | B2 | 8/2023 | Cordes et al. | |
| 2007/0109259 | A1 | 5/2007 | Liu | |
| 2009/0058855 | A1 | 3/2009 | Mishra et al. | |
| 2017/0336860 | A1 | 11/2017 | Smoot et al. | |
| 2018/0050256 | A1* | 2/2018 | Buvid | G06T 13/40 |
| 2018/0217662 | A1* | 8/2018 | Smoot | G06F 3/011 |
| 2020/0088758 | A1* | 3/2020 | Smoot | H04W 4/027 |
| 2020/0193150 | A1* | 6/2020 | Shreve | G06V 20/52 |
| 2024/0185526 | A1* | 6/2024 | Stehlik | G06T 7/80 |
| 2024/0214696 | A1* | 6/2024 | Bristol | H04R 1/028 |

OTHER PUBLICATIONS

U.S. Appl. No. 18/376,986 entitled "Systems and Methods Utilizing Modular Omnidirectional Actuated Floors in an Amusement Park Ride" filed Oct. 5, 2023, 49 pages.

U.S. Appl. No. 18/377,024 entitled "Modular Omnidirectional Actuated Floors Providing an Interactive User Experience" filed Oct. 5, 2023, 50 pages.

"Combined Search and Examination Report for GB Appl. No. 2511902.5, mailed on Jan. 9, 2026".

* cited by examiner

MODULAR OMNIDIRECTIONAL ACTUATED FLOORS PROVIDING A RECONFIGURABLE VIDEO PRODUCTION ENVIRONMENT

FIELD

The present application relates to video production environment, such as virtual production to simulate real-world environments.

BACKGROUND

Virtual production often includes camera filming scenes in front of a large displayed image (e.g., projection surface, display, or chroma panel background) that forms the backdrop for the filming. In instances where the imagery is displayed while filming, the camera and imagery may be aligned such that from the camera's perspective it appears as if the performers are in a real-world environment. In current systems, the performers are on a fixed platform and can only move in a constrained space without walking off camera, or even off the stage or platform itself.

Therefore, a need exists for systems and methods that allow performers to walk for any distance, in any direction, and at any speed without moving off camera, out of filming range, or off the stage.

BRIEF SUMMARY

In one example, a video production system includes a video production environment, a modular floor comprising a plurality of tiles configured to move independently to induce or respond to a motion for a user or users in contact with the modular floor, and a processor configured to modify a configuration of one of the video production environment or the modular floor based on a change of the other of the video production environment or the modular floor.

Optionally, the video production system includes a sensor configured to detect an orientation, position, or movement of the user or users on the modular floor, wherein the processor is configured to modify a configuration of the video production environment based on the detected orientation, position, or movement of the user or users on the modular floor. The video production system my include a screen, wherein the processor is configured to adjust an output of the screen based on the detected orientation, position, or movement of the user or users on the modular floor.

Optionally, the video production environment includes a stage. The modular floor may define at least a portion of the stage. The modular floor may define an infinitely adjustable path for the user or users on the stage.

Optionally, the video production environment includes a camera, one or more props, and a digital background. The processor may be configured to modify the configuration of the video production environment to align the camera, the user or users, and the one or more props to the digital background based on the detected orientation, position, or movement of the user or users.

Optionally, the video production environment includes a digital background, wherein the processor is configured to modify the modular floor based on the digital background.

Optionally, the modular floor is selectively actuated to adjust a walking surface for the user or users.

In another example, a system includes a video production environment, a modular floor including a plurality of tiles configured to move independently to induce or respond to a motion for a user or users in contact with the modular floor, a sensor configured to detect a characteristic of the user or users on the modular floor, and a processor in communication with the sensor. The video production environment may include a camera, a stage, and a screen. The processor may be configured to modify one of the video production environment or the modular floor based on a change of the other of the video production environment or the modular floor.

Optionally, the detected characteristic of the user or users includes at least one of an orientation, a position, or a movement of the user or users on the modular floor. The processor may be configured to modify at least one of the camera, the stage, or the screen based on the detected characteristic of the user or users.

Optionally, the modular floor defines at least a portion of the stage, wherein the processor is configured to modify the stage based on an output of the screen.

Optionally, the video production environment defines a physical environment and a digital environment, wherein the processor is configured to modify the configuration of the video production environment to align the physical environment and the digital environment for video production. The modular floor may be configured to move at least one of a camera, one or more props, or the user or users to align the physical environment and the digital environment.

Optionally, the sensor is configured to track the user or users relative to the camera.

In another example, a video production system includes a video production environment including a camera, a stage, and a screen, the screen configured to provide a digital background; a modular floor defining at least a portion of the stage, the modular floor including a plurality of tiles configured to move independently to induce or respond to a motion for a user or users in contact with the modular floor; a sensor configured to detect an orientation, a position, or a movement of the user or users on the modular floor; and a processor configured to modify a configuration of the video production environment based on the detected orientation, position, or movement of the user or users to align the camera and the user or users to the digital background for video production.

Optionally, the video production environment defines a physical environment and a digital environment, wherein the processor is configured to modify the configuration of the video production environment to align the physical environment and the digital environment. The modular floor may be configured to move the camera or one or more props on the stage to align the physical environment and the digital environment.

Optionally, the modular floor defines at least a portion of the stage.

Optionally, the processor is configured to adjust the digital background based on the detected orientation, position, or movement of the user or users on the modular floor.

Optionally, the sensor includes at least one of a light detection and ranging (LIDAR) system, a camera, or a wearable motion capture device.

DETAILED DESCRIPTION

A modular omnidirectional actuated floor may provide a reconfigurable video production environment (e.g., a stagecraft) that enables a more realistic and accurate movement and emotion (e.g., acting) for characters. For example, the modular floor may form part of a virtual or semi-virtual production environment (e.g., including at least some elements of virtual simulation of real life). The system may include one or more digital backgrounds, cameras, stages, set pieces, and props, among other features, to create and film a scene (e.g., for video production). The modular floor may move or adjust, such as to create or maintain a scene (e.g., prior to filming, dynamically during filming, etc.) and eliminate dimensional constraints during the filming. In some examples, the floor may provide a walking or support surface for an actor to move in one or more directions (e.g., an infinite surface in any direction), such as to allow an actor to move or being prevented from moving in the set. In some examples, the floor may also move objects within the set, such as lighting, props, cameras, or the actor himself or herself, among other objects. In some examples, the floor can support independent movement of multiple actors, such as the floor supporting and moving the actors in any direction, separately or together. In some examples, multiple actors can move (e.g., walk) past each other (e.g., as one actor walking faster than the other), while all the time remaining in a camera's view via independent movement of the floor.

In this manner, the floor enables a more realistic free range of movement for both actors and objects to reduce dimensional and spatial constraints that otherwise are present in the physical set. This allows more natural movement and capture of the actors that is representative of the digital backdrop. For example, an actor can continue to walk along a long path as the digital backdrop displays continuous background images corresponding to a walk in the movie or other content. With conventional systems, the actor could only walk a limited distance before filming would need to pause, the actor reset at the end of the set, and restart to show the continuous movement.

Figure 1:
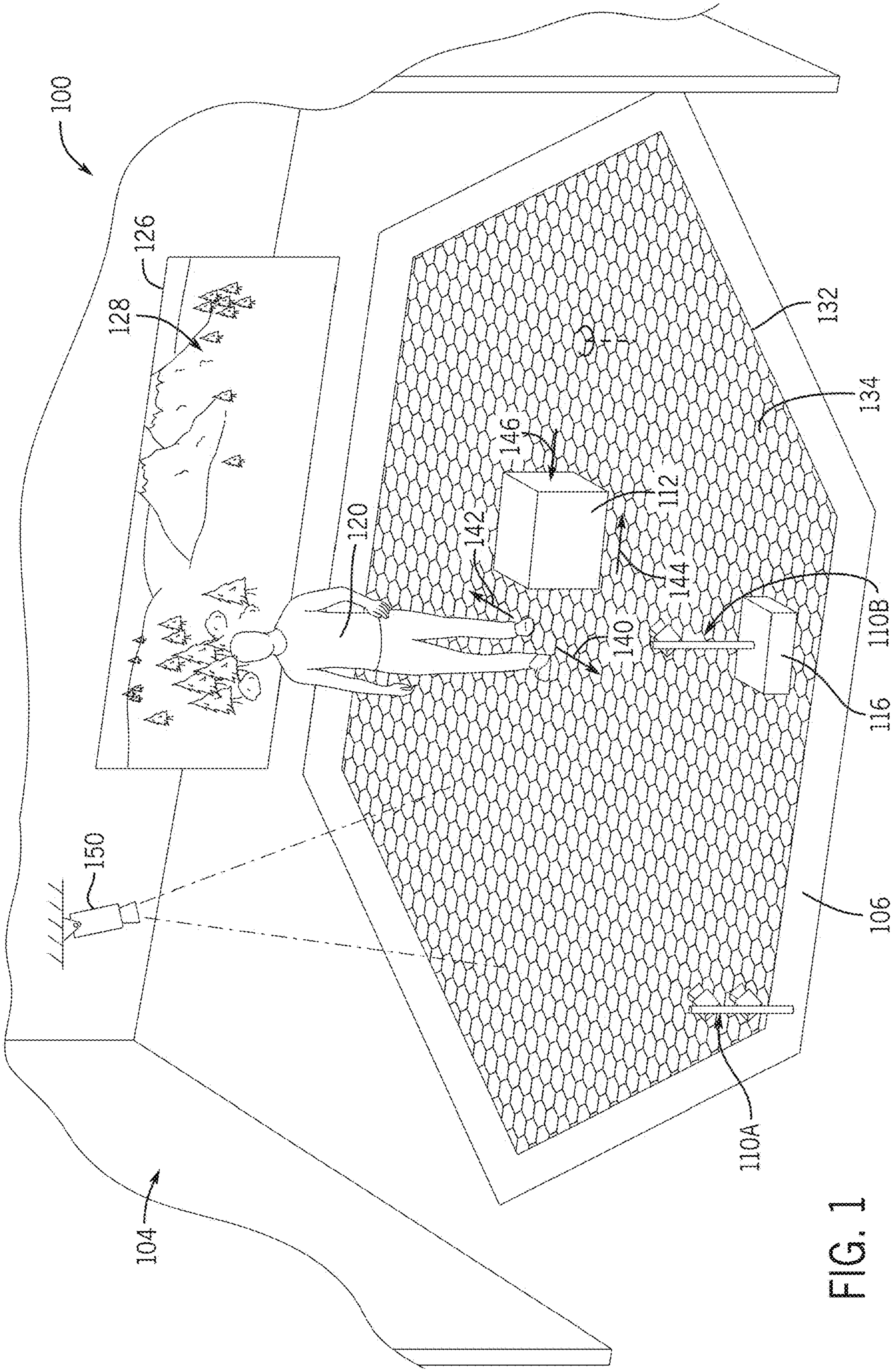
FIG. 1 illustrates an example video production system.

FIG. 1 illustrates an example video production system 100. The system 100 may include multiple elements or subsystems that together define a scene for filming. For example, the system 100 may include a video production environment 104. The video production environment 104 or set may be defined by stagecraft, such as to define a physical environment and a digital environment. The physical environment may include a platform or stage 106, such as to define a floor or ground of the scene. In some examples, the video production environment 104 may include one or more cameras 110 and/or props 112. The camera(s) 110 may be operable to film the scene, and may be fixed in place or positioned on a cart or movable platform 116. For example, a first camera 110A may be fixed in the system 100. A second camera 110B may mounted to the cart or platform 116. In such examples, one camera or multiple cameras may be used to film one or more actors or users 120 in the scene.

The props 112 may include anything movable or portable in the scene, distinct from the actor 120. For example, the props 112 may include hand props, personal props, and set props. In examples, the props 112 may be portable as generally understood, or the props 112 may include set pieces designed to move within the set during filming (e.g., lighting rigs designed to move).

In examples, the system 100 may include a screen 126. The screen 126 or display may provide one or more background images for the scene, such as to define the background of the video production environment 104 (e.g., for filming). In examples, the screen 126 may provide a digital background 128 providing the digital environment of video production. For example, the screen 126 may be defined or provided by a monitor or display. In such examples, the digital background 128 may be controlled (e.g., by a processor or controller) for filming. The screen 126 may be an active display, such as a light emitting diode (LED) or organic light emitting diode (OLED) display, or may be a passive display, such as a display screen, onto which content is projected, such as by a projector. As the actor 120 walks or moves within the video production environment 104, the digital background 128 may be changed, adjusted, or otherwise modified to provide a desired background for a filmed scene.

In examples, the system 100 includes a modular floor 132 or support surface. The modular floor 132 may include a plurality of tiles 134 connected together to form the modular floor 132. For example, any number of tiles 134 may be clipped, connected, or secured together to define a desired size or dimension of the modular floor 132, such as based on scene or set sizes, the particular video production environment 104, etc. In that sense, the modular floor 132 may define at least a portion of the stage 106 or video production environment 104, such as the entirety of the stage 106 or a portion of the stage 106. FIG. 1 illustrates one example implementation of the modular floor 132, but the modular floor 132 may include other configurations.

The tiles 134 may be configured to move independently to induce or respond to a motion for a user (e.g., the actor 120) in contact with the modular floor 132, such as selectively actuated to adjust a walking or running surface for the actor 120. For example, the tiles 134 supporting the actor 120 may induce or respond to the actor 120 moving forward in a first direction 140, such as moving the actor 120 in the first direction 140 or allowing the actor 120 to walk in the first direction 140 while keeping the actor 120 stationary or relatively stationary within the scene (e.g., similar to a treadmill). The tiles 134 may induce or respond to the actor 120 moving in any other direction. For instance, the tiles 134 supporting the actor 120 may induce or respond to the actor 120 moving forward in an opposite second direction 142, such as moving the actor 120 in the second direction 142 or allowing the actor 120 to walk in the second direction 142 while keeping the actor 120 stationary or relatively stationary within the scene. In other words, the modular floor 132 can operate similar to a linear, constant speed conveyor belt in some cases, and can act to cancel the walking movements of the actor 120 so as to keep the actor 120 in one place independent from their actual walking speed, in any direction. As a result, the actor 120 can walk or move in any direction and at any speed without moving out of filming range. The first direction 140 may be away from the screen 126, and the second direction 142 may be toward the screen 126, although other configurations are contemplated, including lateral directions, diagonal directions, circular directions, etc. The first and second directions 140, 142 may be linear directions or rotational directions.

As a result, the modular floor 132 may define an infinitely adjustable path for the user (e.g., actor 120) on the stage 106 to move. For example, as the actor 120 walks or runs, the modular floor 132 (e.g., the tiles 134) may move (e.g., continuously or near continuously, such as automatically) to allow such movement without the actor 120 running out of space for the movement. For instance, the actor 120 may walk in any direction and for any length of time or distance, with the actor 120 remaining on the modular floor 132, in front of the camera(s) 110, and at the correct position relative to the background for filming (e.g., at the same or near the same position in the scene or virtual production environment).

In addition, the modular floor 132 may control a position of one or more objects on the stage 106. For example, the modular floor 132 may move a camera (e.g., the second camera 110B), set pieces, lighting rigs, or other props 112 on the stage 106, such as to align the physical environment and the digital environment, create dynamic real world counterparts to the virtual world (digital background 128), or the like. The objects may be moved by the modular floor 132 in any direction on the stage 106, such as towards the actor 120, away from the actor 120, alongside the actor 120, etc., thereby providing unique configurations and possibilities for filming or video production. For example, the modular floor 132 may move the object in a third direction 144 or a fourth direction 146. The third and fourth directions 144, 146 may be opposite directions or different directions. The third and fourth directions 144, 146 may be similar to or different from the first and second directions 140, 142. The third and fourth directions 144, 146 may be linear directions or rotational directions.

The objects may be moved by the modular floor 132 independent from the actor 120. For example, the actor 120 and objects may be moved in the same or different directions to achieve the desired scene for or during filming. In this manner, the modular floor 132 may be configured to move at least one of a camera, one or more props 112, or the actor 120 to align the physical environment and the digital environment, such as for video production.

In examples, the system 100 may include a sensor 150. The sensor 150 may be configured to detect a characteristic of the user (e.g., the actor 120) on the modular floor 132. For example, the sensor 150 may detect at least one of an orientation, a position, or a movement of the actor 120 on the modular floor 132, such as to track the actor 120 to the camera. Based on the detected characteristic, the video production environment 104 may be modified, such as to align the camera and the actor 120 to the digital background 128 for video production, alter the digital background 128 based on movement of the actor 120, or the like. For instance, the modular floor 132 may move to position the actor 120 within the field of view of the camera, such as to position the actor 120 at a desired location in front of the screen 126 (e.g., at a desired spot relative to the digital background 128). In some examples, the digital background 128 may be adjusted based on the detected movement or position of the actor 120, such as to maintain or provide the desired scene. In some examples, the same sensor 150 or a different sensor may detect the orientation, position, or movement of other objects on the modular floor 132, such as the second camera 110B or one or more props 112, for similar purposes.

The sensor 150 may be implemented in different ways based on the particular application. For example, the sensor 150 may be a camera, as shown in FIG. 1. Such examples are illustrative only, and the sensor 150 may include other configurations, such as including a camera, a light detection and ranging (LIDAR) system, a wearable motion capture device 152 (see FIG. 2), or any combination thereof to detect a movement or position of the actor 120 for adjusting the modular floor 132 and/or digital background 128.

In examples, the video production environment 104 may be modified based on a change of the screen 126 or digital background 128. For example, as the screen 126 or digital background 128 changes, the modular floor 132 may adjust, such as to move the actor 120 (or other objects) to a desired position for filming. In such examples, the sensor 150 may be used to confirm the actor 120 or other objects (e.g., props 112) are in a desired position relative to the camera or digital background 128. In this manner, either the modular floor 132 or the digital background 128 or backdrop may change based on the other, such as to provide a desired scene or artistic effect for filming.

In examples, the modular floor 132 or the content of the screen 126/digital background 128 may be synched or synchronized to each other based on sensed information (either one way or two way), such as synching the modular floor 132 or the digital content to each other to ensure alignment. For example, the content displayed by the digital background 128 may be synched to the movement of the actor 120 or the modular floor 132. Additionally, or alternatively, the position/orientation of the actor 120 may be synched to the content display on the screen 126. In this regard, the sensor 150 may be used to ensure the modular floor 132 and displayed content are synchronized to each other. In such examples, the modular floor 132 may move the actor 120 into the correct position based on the timing and frames being displayed behind the actor 120.

The synchronization may be exact or within a threshold. For example, the modular floor 132 and digital background 128 may be exact or near exact such that the actor 120 or objects 112 are in an exact location at an exact time. In other examples, the synchronization may be set to maintain a particular threshold or range (e.g., within a threshold distance from an exact location, within a threshold time span from an exact time, etc.). Such examples may provide acting freedom for the actor 120 (e.g., the actor 120 has some freedom to move within an area for a given timing). The position and timing may be set by a program (e.g., automatically) or manually by a user. For example, a director or other user may set or update the desired position of the actor 120/objects 112, such as in real time or near real time, based on directorial input, etc.

Figure 2:
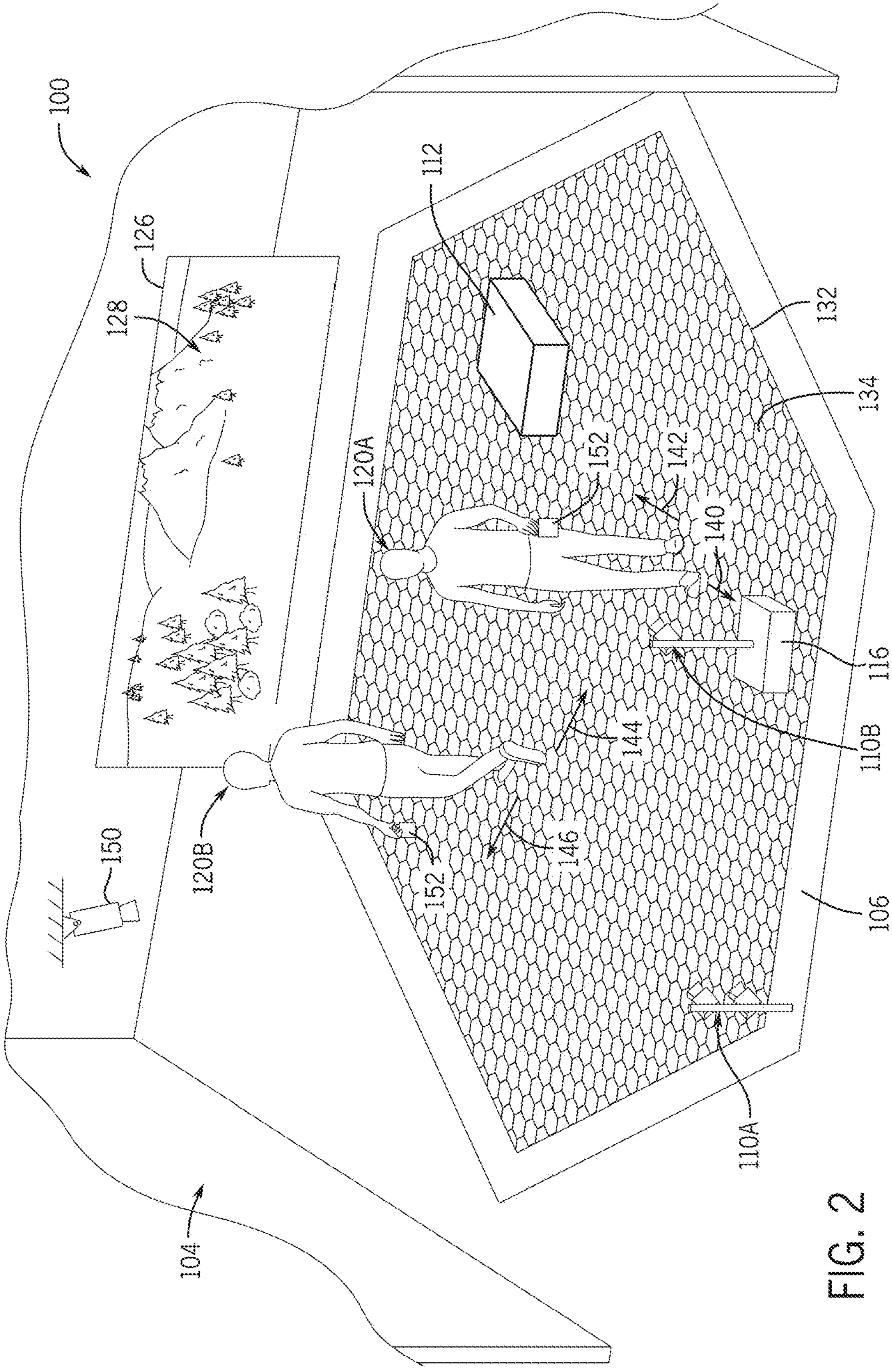
FIG. 2 illustrates another example video production system.

FIG. 2 illustrates another implementation of the video production system 100. In examples, the modular floor 132 may support multiple actors 120 (e.g., a first actor 120A and a second actor 120B, three or more actors 120, etc.) for video production. In such examples, the modular floor 132 may allow or provide infinite walking of multiple actors 120, such as access to what appears to be an unlimited space in any direction, simultaneously. For example, the modular floor 132 may support two or more actors 120 moving at different speeds and directions relative to each other (e.g., the first actor 120A being held in place while the second actor 120B is allowed to move relative thereto, the actors moving towards or away from one another, the first actor

120A moving in one direction and the second actor 120B moving in a different direction, etc.). As a result, each actor 120 can walk or move in any direction and at any speed with each actor 120 staying in filming range. For example, the first actor 120A may walk or move in either the first direction 140 or the second direction 142, with the second actor 120B walking or moving in either the third direction 144 or the fourth direction 146. Depending on the application, each actor 120 can walk or move in any direction and at any speed without the actors bumping into each other or crossing each other's paths. In examples, the modular floor 132 may support multiple actors 120 all walking in substantially the same direction, or each moving in a separate direction. One or more actors 120 may walk and make physical progress against the fixed Earth, such as bypassing other actors 120 as the modular floor 132 counteracts movements of the other actors 120.

In some examples, the modular floor 132 may move the actors 120 to desired positions within the scene. For example, the modular floor 132 may independently move the first actor 120A to a first position and the second actor 120B to a second position within the scene, such as to provide a desired theatrical or other effect. As one example, the modular floor 132 may move independently to maintain both actors 120A, 120B within the field of view of a single camera, irrespective of each actors movement or perceived movement, such as to support filming of both actors by a single camera from a single point of view. In other examples, the modular floor 132 may move independently to maintain the first actor 120A within the field of view of the first camera 110A, and to maintain the second actor 120B within the field of view of the second camera 110B, such as to support simultaneous filming of both actors 120A, 120B by different cameras at different points of view. In addition to moving the actors 120A, 120B and/or cancelling the walking movements of the actors 120A, 120B, the modular floor 132 may move a camera (e.g., the second camera 110B), set pieces, lighting rigs, or other props 112 on the stage 106 and relative to the multiple actors 120.

In the example of FIG. 2, the sensor 150 may detect the characteristics of both actors 120A, 120B. For example, the sensor 150 may detect at least one of an orientation, a position, or a movement of each actor 120 on the modular floor 132, such as to modify the video production environment 104 based on the detected characteristics. In other examples, dedicated sensors may be provided for each actor 120, such as a first sensor for monitoring the first actor 120A, and a second sensor for monitoring the second actor 120B. Based on the detected characteristics of the actors 120, the video production environment 104 may be modified, such as to align the physical environment with the digital environment, alter the digital background 128 based on movement of the actors 120, or the like.

Figure 3:
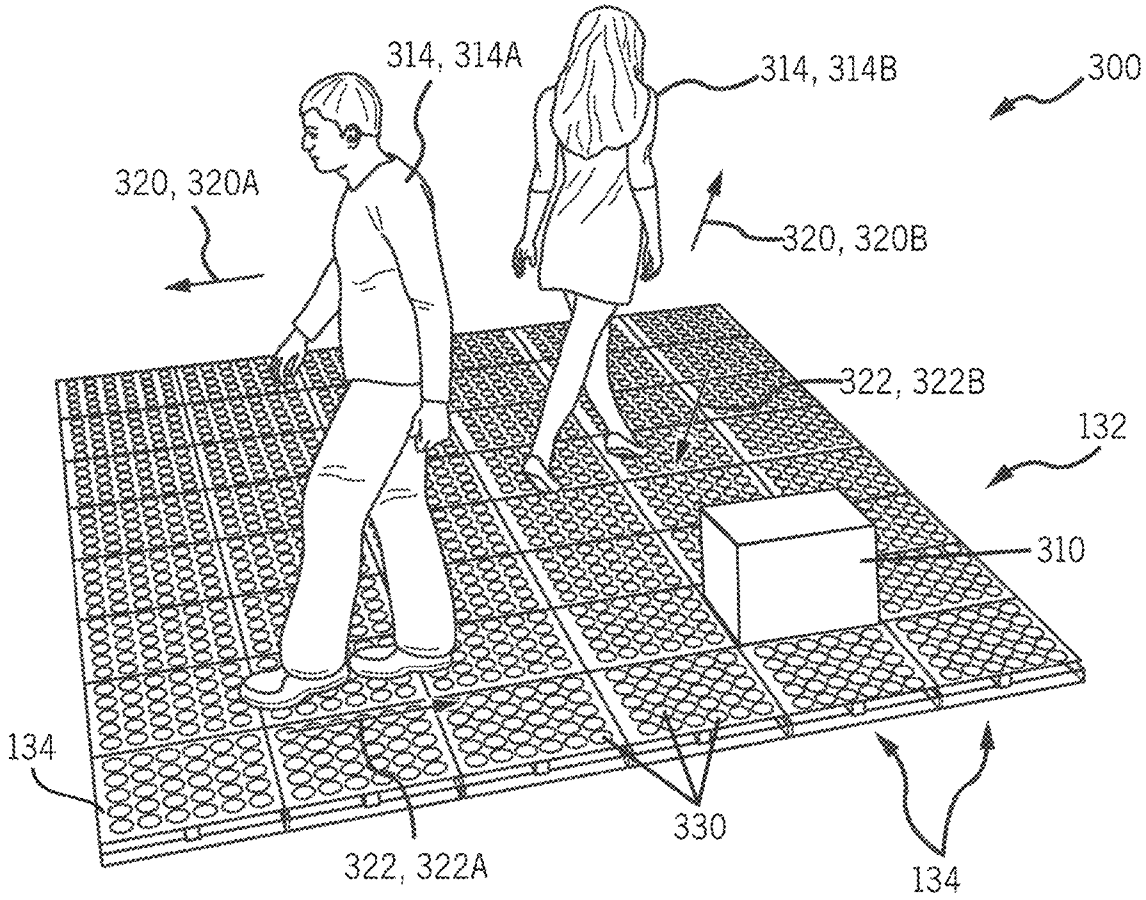
FIG. 3 illustrates an example motion system including a modular floor formed with a plurality of active tiles, such as for use in a video production system.

FIG. 3 illustrates an example motion system 300 including the modular floor 132 formed with a plurality of active tiles 134. Each tile 134 may include the same or similar shape, such that multiple tiles 134 may be connected together to form the modular floor 132 (e.g., of any shape that by repetition can cover a surface without substantial gaps). For example, each tile 134 may include a shape that allows multiple tiles 134 to be connected together to form an integrated surface of the modular floor 132. For instance, each tile 134 may include a polygonal shape of any closed plane figure bounded by three or more line segments, such as three line segments defining a triangular shape, four line segments defining a quadrilateral shape, or more than four line segments defining another polygonal shape (e.g., six line segments defining a hexagonal shape, among other suitable shapes). In other examples, the tiles 134 may have curved edges that still mesh to create a contiguous surface. In such examples, any number of tiles 134 may be connected together to define the modular floor 132 of a desired size and shape. The various tiles 134 may be coupled together (e.g., via interlocking or coupling features) or the tiles 134 may be positioned adjacent one another to define the modular floor 132.

As described herein, the motion system 300 may provide or facilitate motion of one or more objects 310 (e.g., cameras, set pieces, lighting rigs, or props 112) on the modular floor 132. For instance, the motion system 300 may move one or more objects 310 across the modular floor 132, such as from a first location to a second location on the modular floor 132. Additionally, or alternatively, the motion system 300 may allow one or more user participants 314 (e.g., actor 120 or actors 120A, 120B) to move across the modular floor 132 or walk/run on the modular floor 132, such as part of video production system 100, an exercise program, a gaming system, a control system, or the like. Such examples are non-limiting, and the modular floor 132 may provide or facilitate motion of any object or user positioned at least partially on the modular floor 132. For example, in some embodiments, the modular floor 132 may provide or facilitate motion of ride vehicles, gaming objects, containers, or any other object placed or positioned on the modular floor 132.

In one example, the modular floor 132 may be operated to allow a user participant 314 to walk or run under the user's own power. In such examples, a set of tiles 134 (or at least components of the set of tiles 134) associated with the present location and a predicted travel path 320 of the user participant 314 may be operated concurrently and in a like manner to move in another direction 322, such as opposite the current or predicted travel path 320. In this manner, the motion system 300 may control a position of the user participant 314 on the modular floor 132 (e.g., maintained at a specific location), even while the user participant 314 is walking or running, such as to limit the user participant 314 from walking off the modular floor 132 and/or to avoid a collision with another object 310 or user participant 314 on the modular floor 132. The motion 322 imparted to the user participant 314 may slow the movement of the user participant 314 relative to the modular floor 132 (e.g., the user participant 314 moves at a rate that is slower than the user's walking/running pace), halt the relative motion (e.g., the user participant 314 effectively walks/runs in place), or increase the relative motion (e.g., the user participant 314 moves at a rate that is faster than the user's walking/running pace).

In one example, the motion system 300 may be used to support independent movement of multiple (e.g., two or more) user participants 314. For instance, as shown, the motion system 300 may support a first user participant 314A moving (e.g., walking, running, etc.) along a first travel path 320A, and a second user participant 314B moving (e.g., walking, running, etc.) along a second travel path 320B that differs from the first travel path 320A. In such examples, the motion system 300 may impart respective motions 322A, 322B on the first and second user participants 314A, 314B, such as in a manner as described above. The motions 322A, 322B imparted to the user participants 314A, 314B may be independent and concurrent, even while different in the example illustrated. In some examples, the modular floor 132 may be configured to move or facilitate movement of an object 310 or user participant 314 in any direction (e.g., any lateral direction across the modular floor 132), such that the modular floor 132 may be considered an omnidirectional actuated floor.

The motion control described herein may be provided by one or more disk assemblies 330 of the motion system 300. As shown, each tile 134 may include one or more disk assemblies 330, such as a plurality of disk assemblies 330. In such examples, the disk assemblies 330 may support the one or more objects 310 or user participants 314 on the modular floor 132. The disk assemblies 330 may be operated to move the objects 310/user participants 314 on the modular floor 132, such as in a manner as described herein. For example, the disk assemblies 330 may engage the objects 310/user participants 314 so as to move the objects 310/user participants 314 as the disk assemblies 330 are operated, as described herein.

Figure 4:
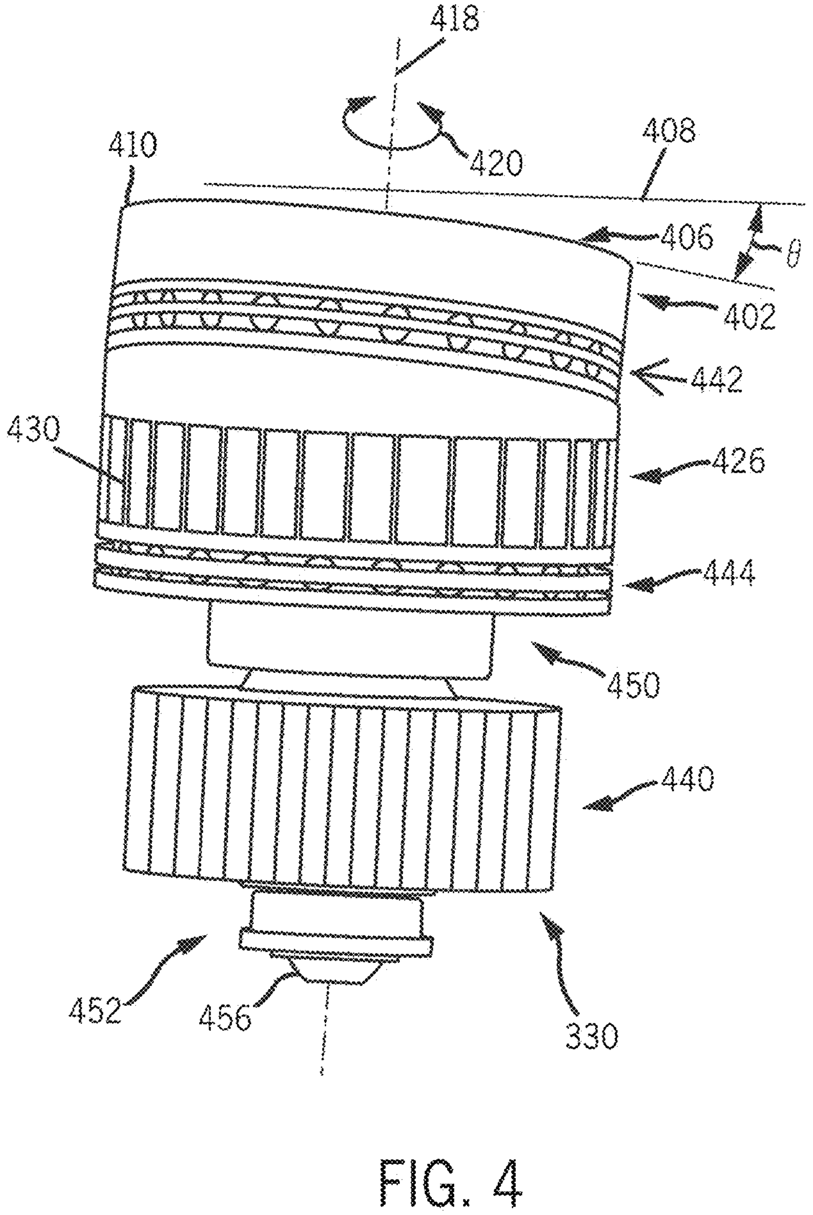
FIG. 4 illustrates an example disk assembly for use in a motion system.
Figure 5:
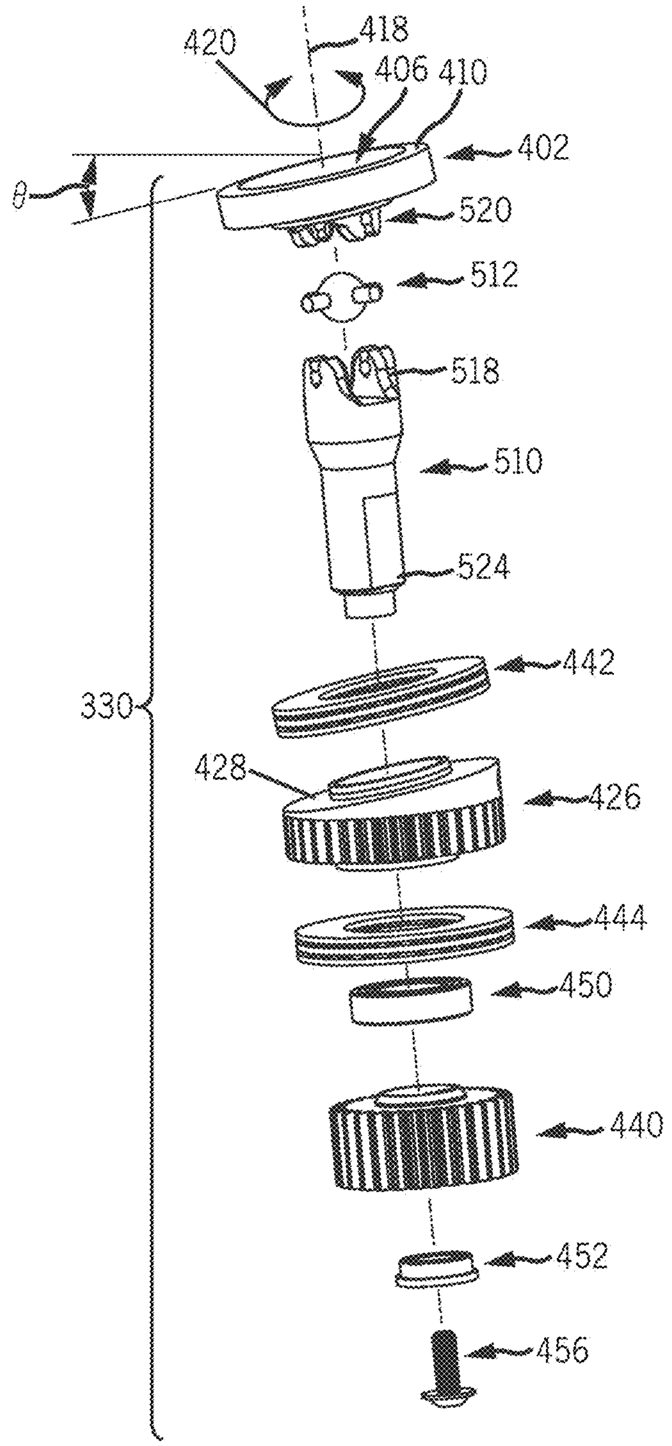
FIG. 5 illustrates an exploded view of the disk assembly of FIG. 4.

FIG. 4 illustrates an example disk assembly 330 for use in a system of the present description (e.g., video production system 100, motion system 300, described above), such as with a plurality of other disk assemblies 330 in an active tile 134. FIG. 5 illustrates an exploded view of the disk assembly 330. The disk assembly 330 may include a contact disk 402. The contact disk 402 may be at a first end (e.g., an outer or exposed end) of the disk assembly 330 and includes an upper surface 406. In one example, the upper surface 406 may be used in the modular floor 132 described herein, such as with a plurality of other surfaces to support and move an object 310. The contact disk 402 may be positioned and/or supported in the disk assembly 330 so as to place the upper surface 406 at a tilt angle θ, such as relative to the plane 408 of the active tile 134. In one example, the upper surface 406 may include a contact surface 410 defined by a raised segment or edge relative to the rest of the upper surface 406. In such examples, the contact surface 410 (along with similar segments/portions of other contact disks in an active tile 134) may contact and support an object placed on the disk assembly 330. The tilt angle θ may be an angle of 5 to 60 degrees, with about 8 to 15 degrees being useful in some examples, and about 10 degrees (e.g., 9.5 to 10.5 degrees) being useful in one implementation.

During use, the contact disk 402 may be rotated about a rotation axis 418, such as shown by arrows 420. As shown, the rotation axis 418 extends at a non-orthogonal angle to the plane of the upper surface 406. In this manner, the contact surface 410 of the contact disk 402 may be positioned at a predefined location relative to the rotation axis 418 during operation of the disk assembly 330, such as to move a supported object in a desired direction, as described herein. For example, the disk assembly 330 may include a swashplate 426 provided with an angled or tilted surface 428 to support the contact disk 402 at the tilt angle θ. The swashplate 426 may be drivable to selectively change where the contact surface 410 is located relative to the rotation axis 418. For instance, the swashplate 426 may be drivable via outer teeth 430 as shown in FIG. 4, be belt driven, or the like. In such examples, selective positioning of the contact surface 410 via rotation of the swashplate 426 may control which direction a supported object is moved. In one example, the swashplate 426 may remain stationary or fixed in place relative to the rotation axis 418 during the rotation 420 of the contact disk 402.

The disk assembly 330 may include various drive components and bearings to support and to facilitate rotation of the contact disk 402 under load. For example, the disk assembly 330 may include a gear 440 for rotating the contact disk 402 about the rotation axis 418, as detailed herein. A first thrust bearing 442 may be positioned between the contact disc and the swashplate 426, such as to reduce friction between the contact disc and the swashplate 426. A second thrust bearing 444 may be positioned between the swashplate 426 and the gear 440, such as to reduce friction between the swashplate 426 and the gear 440. The first and second thrust bearings 442, 444 may be configured to transfer a load on the contact disk 402 downward into the disk assembly 330 (e.g., into the stack of components of the disk assembly 330). For instance, the first thrust bearing 442 may transfer a downward load from the contact disk 402 onto the swashplate 426, and the second thrust bearing 444 may transfer the downward load from the swashplate 426 onto the gear 440. In some examples, the disk assembly 330 may include a top bearing 450 and a bottom bearing 452, such as for the purposes described below. A fastener 456 may secure the components of the disk assembly 330 together as an operable unit.

Referring to FIG. 5, the disk assembly 330 may include a drive shaft 510. The drive shaft 510 may be coupled to the contact disk 402 and driven by the gear 440. For instance, the disk assembly 330 may include a U-joint 512 pivotally coupled to both an end 518 of the drive shaft 510 and an underside 520 of the contact disk 402. The U-joint 512 may allow the contact disk 402 to be rotated while the high-point or contact surface 410 of the contact disk 402 is turned or redirected via the swashplate 426 to change the tilt direction or disk orientation of the contact disk 402 (e.g., to change the location of the contact surface 410 relative to the rotation axis 418). The drive shaft 510 may be coupled to the gear 440 (e.g., via a keyed engagement 524) such that rotation of the gear 440 rotates the drive shaft 510. In such examples, rotation of the gear 440 causes the drive shaft 510 to rotate, which, in turn, causes the contact disk 402 to rotate about the rotation axis 418. With continued reference to FIG. 5, the top and bottom bearings 450, 452 may rotationally support the drive shaft 510, such as centering the drive shaft 510 within the disk assembly 330.

According to various examples described herein, the contact disk 402 is supported at the tilt angle θ by the tilted surface 428 of the swashplate 426 and then selectively rotated 420 about the rotation axis 418 while the swashplate 426 remains stationary, such as to move an object supported upon the contact surface 410 of the upper surface 406. Rotation 420 may be provided through a disk rotation mechanism (which includes at least the gear 440) in the disk assembly 330 that works in combination with a drive system (not shown in FIGS. 4-5) (e.g., one or more motors driving belts, screw drives, gears, or the like to impart motion on one or more components of the disk rotation mechanism such as upon the outer teeth 430 of the gear 440).

The upper surface 406 is circular in shape in the illustrated embodiment, with the contact surface 410 being an outer ring-shaped surface or lip configured to engage surfaces of a supported object. The contact disk 402 is positioned or supported at the disk or tilt angle θ (e.g., an angle in the range of 5 to 60 degrees or the like as measured between a horizontal plane and the upper surface 406 of the contact disk 402). Such configurations cause a raised edge or portion of the contact surface 410 to contact and move an object (e.g., a person, a ride vehicle, a container, or any other object) supported upon the contact disk 402. The raised edge/segment may be a fraction of the contact surface 410, such as in the range of 1/10 to 2/5 of the available surface, depending on the magnitude of the tilt angle θ.

Each disk assembly 330 may be adapted to allow the contact disk 402 to be oriented as desired to set the location of the contact surface 410 relative to the rotation axis 418.

For instance, the contact disk 402 may be rotated relative to the rotation axis 418, such as by rotation of the swashplate 426 about the rotation axis 418, to orient the contact disk 402 relative to the rotation axis 418, as described above. In such examples, the orientation of the contact surface 410 relative to the rotation axis 418 may define the direction a supported object is moved by the disk assembly 330.

Figure 6A:
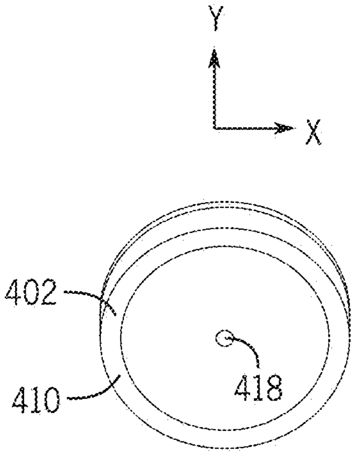
FIGS. 6A-6D illustrate various orientations of a tilted contact disk of the disk assembly of FIG. 4 that define respective directions a supported object is moved by the disk assembly.

For example, FIGS. 6A-6D illustrate various orientations of the contact disk 402 that define respective directions a supported object is moved by the disk assembly 330. Referring to FIG. 6A, the tilt direction or disk orientation of the contact disk 402 may be set with the contact surface 410 at the "top" of the contact disk 402 (when looking at the page containing FIG. 6A). If the contact disk 402 is rotated clockwise about the rotation axis 418, a supported object may be moved in a positive X direction or to the right when looking at the page containing FIG. 6A. Conversely, if the contact disk 402 is rotated counterclockwise about the rotation axis 418, the supported object may be moved in a negative X direction or the left when looking at the page containing FIG. 6A.

Figure 6B:
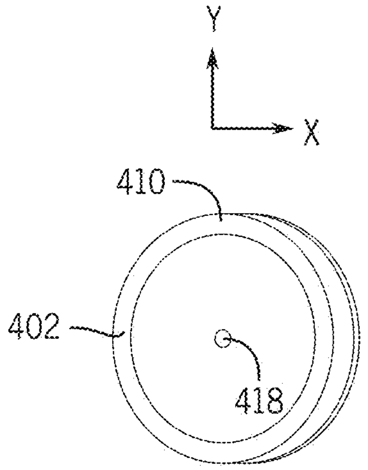

Referring to FIG. 6B, the tilt direction or disk orientation of the contact disk 402 may be set with the contact surface 410 at the "right" of the contact disk 402 (when looking at the page containing FIG. 6B). If the contact disk 402 is rotated clockwise about the rotation axis 418, a supported object may be moved in a negative Y direction or downwards when looking at the page containing FIG. 6B. Conversely, if the contact disk 402 is rotated counterclockwise about the rotation axis 418, the supported object may be moved in a positive Y direction or upwards when looking at the page containing FIG. 6B.

Figure 6C:
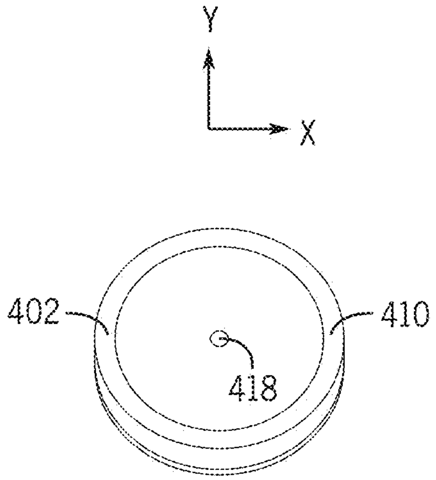

Referring to FIG. 6C, the tilt direction or disk orientation of the contact disk 402 may be set with the contact surface 410 at the "bottom" of the contact disk 402 (when looking at the page containing FIG. 6C). If the contact disk 402 is rotated clockwise about the rotation axis 418, a supported object may be moved in a negative X direction or to the left when looking at the page containing FIG. 6C. Conversely, if the contact disk 402 is rotated counterclockwise about the rotation axis 418, the supported object may be moved in a positive X direction or the right when looking at the page containing FIG. 6C.

Figure 6D:
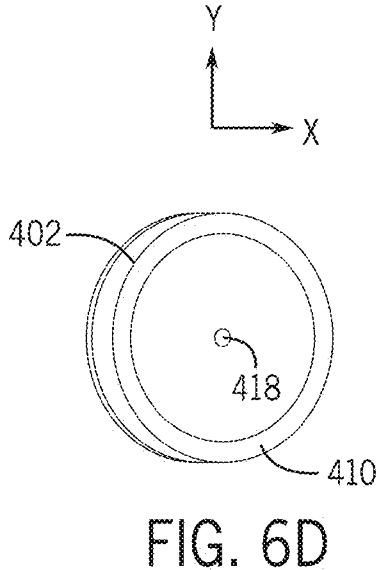

Referring to FIG. 6D, the tilt direction or disk orientation of the contact disk 402 may be set with the contact surface 410 at the "left" of the contact disk 402 (when looking at the page containing FIG. 6D). If the contact disk 402 is rotated clockwise about the rotation axis 418, a supported object may be moved in a positive Y direction or upwards when looking at the page containing FIG. 6D. Conversely, if the contact disk 402 is rotated counterclockwise about the rotation axis 418, the supported object may be moved in a negative Y direction or downwards when looking at the page containing FIG. 6D.

During any particular operation period used to move an object in a particular direction, the components of the disk assembly 330 may be configured to allow the contact disk 402 to be oriented in any of the four orientations or disk directions illustrated in FIGS. 6A-6D (or to any intermediate position between these four orientations) and to concurrently allow the contact disk 402 to be rotated at a desired rate or speed about the rotation axis 418, while remaining at the tilt angle θ at the particular disk face orientation/direction. As a result, the disk assemblies 330 may move an object 100 or user participant 314 along (or allow a user participant 314 to walk/run in) any direction across the modular floor 132. In this manner, the disk assemblies 330 may define an omnidirectional actuated floor.

Arrays or pluralities of the disk assemblies 330 may be combined into a single tile 134, and multiple tiles 134 may be combined to provide the modular floor 132 described herein, or can be used in combination to provide a large floor or platform to move supported objects 310. In such embodiments, each drive assembly may be driven independently; however, it may be useful in some embodiments to concurrently drive an array or subset of the disk assemblies 330 used to make up a support floor/platform, such as by orienting and driving/rotating each contact disk 402 in an active tile 134 similarly (e.g., drive each drive assembly in an active tile 134 concurrently and similarly to move an object on the tile 134 in a particular direction and at a particular speed).

Figure 7:
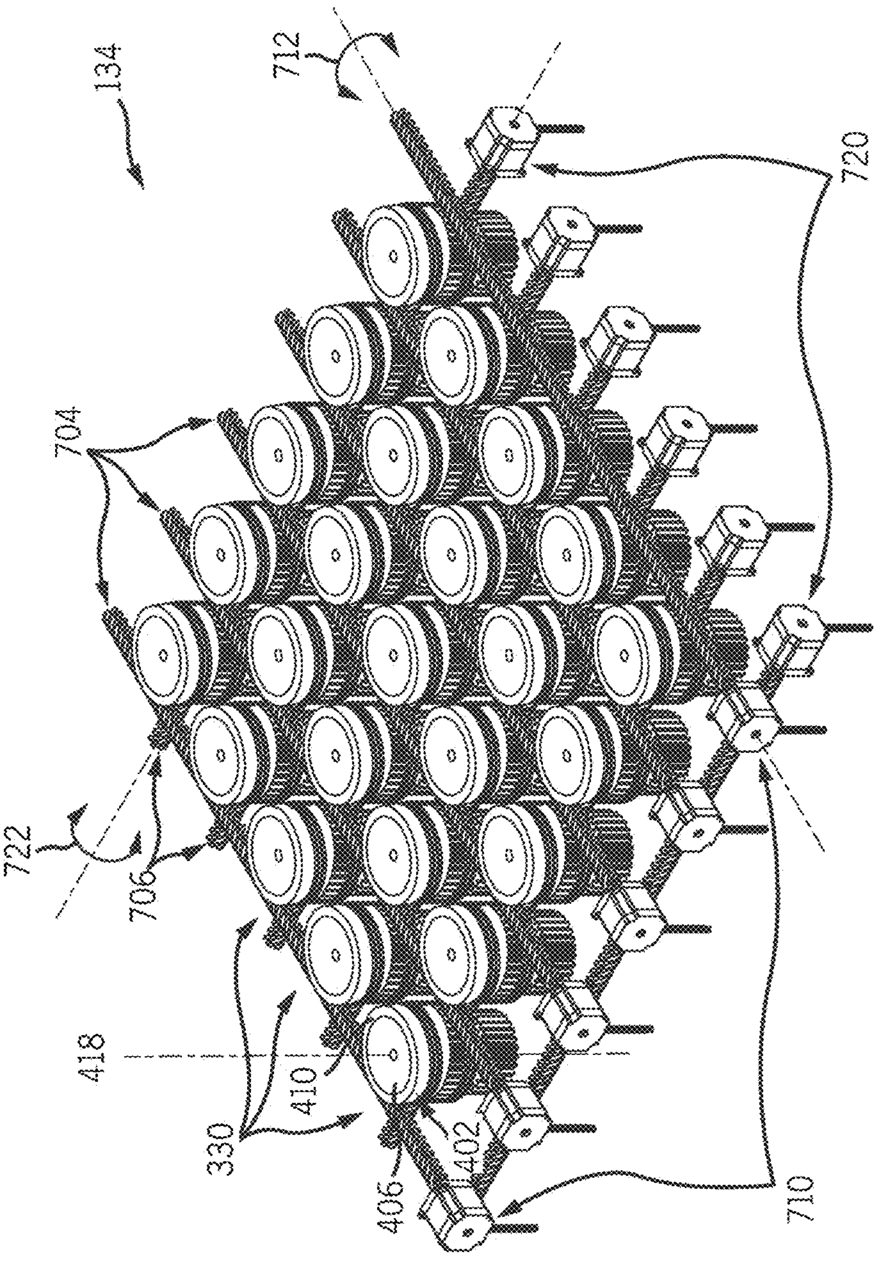
FIG. 7 illustrates a portion of an active tile including an array of disk assemblies.

Accordingly, FIG. 7 illustrates a portion of an active tile 134 including an array or plurality of disk assemblies 330. Referring to FIG. 7, an array or plurality of disk assemblies 330 may be arranged in a pattern. For example, multiple disk assemblies 330 may be arranged in a rectangular pattern of parallel rows and columns, although other configurations are contemplated. The disk assemblies 330 may include parallel rotation axes 418 with the upper surfaces 406 facing a single direction. For example, each contact disk 402 may be oriented to have the same disk direction or to have its tilt angle oriented in the same way. The disk assemblies 330 may be driven together as a set or concurrently to rotate at the same rate and in the same direction about their rotation axes 418. In this manner, the plurality of disk assemblies 330 (or a subset of the disk assemblies 330) may move an object supported thereon in the same direction and at the same rate.

In the embodiment shown in FIG. 7, first lead screws 704 are positioned to contact the outer teeth 430 of each swashplate 426, and second lead screws 706 are positioned to contact the geared/toothed outer surface of each gear 440. One or more drive motors 710 may be selectively controlled to rotate 712 the first lead screws 704 as needed/desired to set the tilt direction or disk orientation of each contact disk 402 (e.g., to orient the contact disks 402 by rotating the swashplates 426 about their respective rotation axis 418), such as to position raised edges of the contact disks 402 concurrently in a desired location. Stated differently, rotation of the first lead screws 704 by the drive motors may cause the swashplates 426 to rotate about their respective rotation axes 418, which, in turn, causes the supported contact disks 402 to likewise rotate to position the contact surfaces 410 at a new location.

Concurrently or at a different time, one or more spin motors 720 may be selectively controlled to rotate the second lead screws 706, thereby driving the gears 440 to rotate (e.g., at the same rate). Rotation of the gears 440 may cause the contact disks 402 to rotate, with the direction of rotation of the contact disks 402 set by a direction of rotation 722 of the second lead screws 706. Similarly, the rate of rotation of the contact disks 402 may be set by the rate of rotation 722 of the second lead screws 706.

Such examples are illustrative only, and the modular floor 132 may be operated using other systems and configurations. For instance, the contact disks 402 may be rotated via intermeshing gears, among other examples. In some examples, one or more (e.g., each) contact disks 402 may be rotated via a gear train including multiple gears. In such examples, one or more motors (e.g., spin motors 710 and/or 720) may be selectively controlled to rotate the gears, thereby causing the contact disks 402 to rotate.

The embodiments illustrated in FIGS. 3-7 are non-limiting examples for providing a motion system including a modular floor formed with a plurality of active tiles, the active tiles having one or more disk assemblies with a rotatable, angled disk and with mechanisms for rotating/spinning the disk and for orienting the disk to have its raised edge/portion in a desired location to direct a supported object in a desired direction during disk rotation. Thus, the motion system 300, modular floor 132, active tiles 134, and disk assemblies 330, described above, are illustrative only, and other configurations are contemplated. In one example, the systems and elements described herein (e.g., the tiles 134 and disk assemblies 330) may be similar to those described in U.S. patent application Ser. No. 15/790,124, now U.S. Pat. No. 10,416,754 B2, and U.S. patent application Ser. No. 16/135,952, now U.S. Pat. No. 10,732,197 B2, the disclosures of which are hereby incorporated by reference for all purposes.

Figure 8:
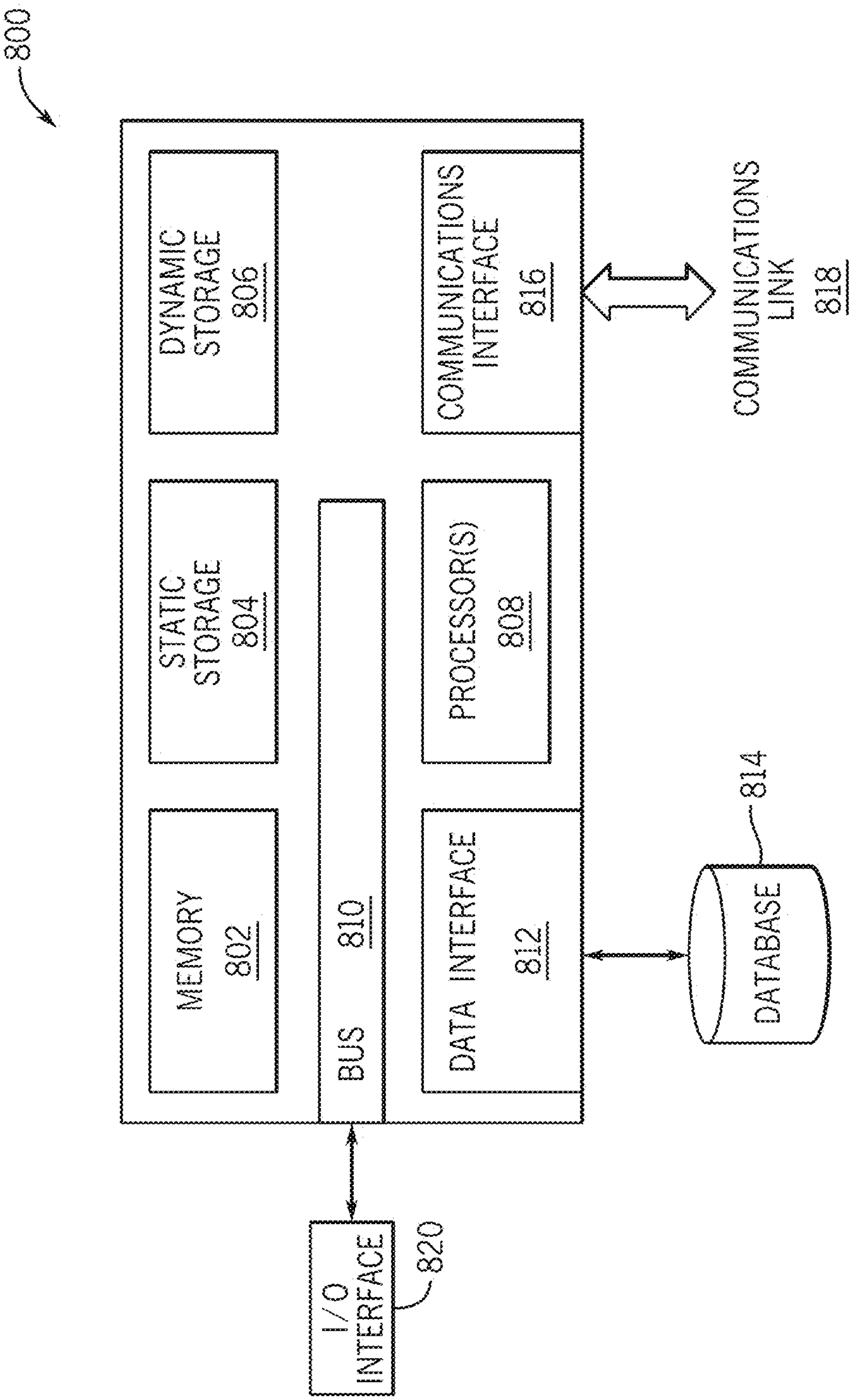
FIG. 8 illustrates an example computing system for implementing various examples of the present disclosure.

FIG. 8 illustrates an example computing system 800 for implementing various examples described herein. For example, in various embodiments, components of the motion system 300 or other systems described herein may be implemented by one or several computing systems 800. This disclosure contemplates any suitable number of computing systems 800. For example, the computing system 800 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 800 may include one or more computing systems; be unitary or distributed; span multiple locations; span multiple machines; span multiple data centers; or reside in a cloud, which may include one or more cloud components in one or more networks.

Computing system 800 includes a bus 810 (e.g., an address bus and a data bus) or other communication mechanism for communicating information, which interconnects subsystems and devices, such as processor 808, memory 802 (e.g., RAM), static storage 804 (e.g., ROM), dynamic storage 806 (e.g., magnetic or optical), communications interface 816 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 820 (e.g., keyboard, keypad, mouse, microphone, display). In particular embodiments, the computing system 800 may include one or more of any such components.

In particular embodiments, processor 808 includes hardware for executing instructions, such as those making up a computer program. For example, a processor 808 may execute instructions for various components of the motion system 300 or other systems described herein. The processor 808 circuity includes circuitry for performing various processing functions, such as executing specific software to perform specific calculations or tasks. In particular embodiments, I/O interface 820 includes hardware, software, or both, providing one or more interfaces for communication between computing system 800 and one or more I/O devices. Computing system 800 may include one or more of these I/O devices, where appropriate. One or more of these I/O devices may enable communication between a person and computing system 800.

In particular embodiments, the communications interface 816 includes hardware, software, or both providing one or more interfaces for communication (such as, for example, packet-based communication) between computing system 800 and one or more other computer systems or one or more networks. One or more memory buses (which may each include an address bus and a data bus) may couple processor 808 to memory 802. Bus 810 may include one or more memory buses, as described below. In particular embodiments, one or more memory management units (MMUs) reside between processor 808 and memory 802 and facilitate accesses to memory 802 requested by processor 808. In particular embodiments, bus 810 includes hardware, software, or both coupling components of computing system 800 to each other.

According to particular embodiments, computing system 800 performs specific operations by processor 808 executing one or more sequences of one or more instructions contained in memory 802. For example, instructions for the video production system 100, the motion system 300 or other systems described herein (e.g., to perform the operations described above) may be contained in memory 802 and may be executed by the processor 808. For example, the processor 808 may be configured to modify a configuration of one of the video production environments 104 or the modular floor 132 based on a change of the other. In examples, the processor 808 may be configured to modify a configuration of the video production environment 104 based on sensory input (e.g., based on a detected orientation, position, or movement of the actor 120 or actors 120 on the modular floor 132). In such examples, the processor 808 may be in communication with the sensor 150. Based on the detected orientation, position, or movement of the actor 120 or actors 120, the processor 808 may adjust an output of the screen 126, such as adjusting the digital background 128 based on a detected orientation, position, or movement of the actor(s) 120 on the modular floor 132. In examples, the processor 808 may be configured to modify the configuration of the video production environment 104 to align the physical environment and the digital environment for video production, such as aligning one or more cameras (e.g., the second camera 110B), the actor(s) 120, and one or more props 112 to the digital background 128. For instance, the processor may be configured to modify at least one of a camera, the stage 106, or the screen 126 (e.g., the digital background 128) based on detected characteristics of the actor(s) 120. In examples, the processor 808 may be configured to modify the modular floor 132 based on the digital background 128.

Such instructions may be read into memory 802 from another computer readable/usable medium, such as static storage 804 or dynamic storage 806. In alternative embodiments, hard-wired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 808 for execution. Such a medium may take many forms, including but not limited to, nonvolatile media and volatile media. Non-volatile media includes, for example, optical or magnetic disks, such as static storage 804 or dynamic storage 806. Volatile media includes dynamic memory, such as memory 802.

Computing system 800 may transmit and receive messages, data, and instructions, including program, e.g., application code, through communications link 818 and communications interface 816. Received program code may be executed by processor 808 as it is received, and/or stored in static storage 804 or dynamic storage 806, or other storage for later execution. A database 814 may be used to store data accessible by the computing system 800 by way of data interface 812. In various examples, communications link 818 may communicate with the motion system 300 or other systems described herein.

Figure 9:
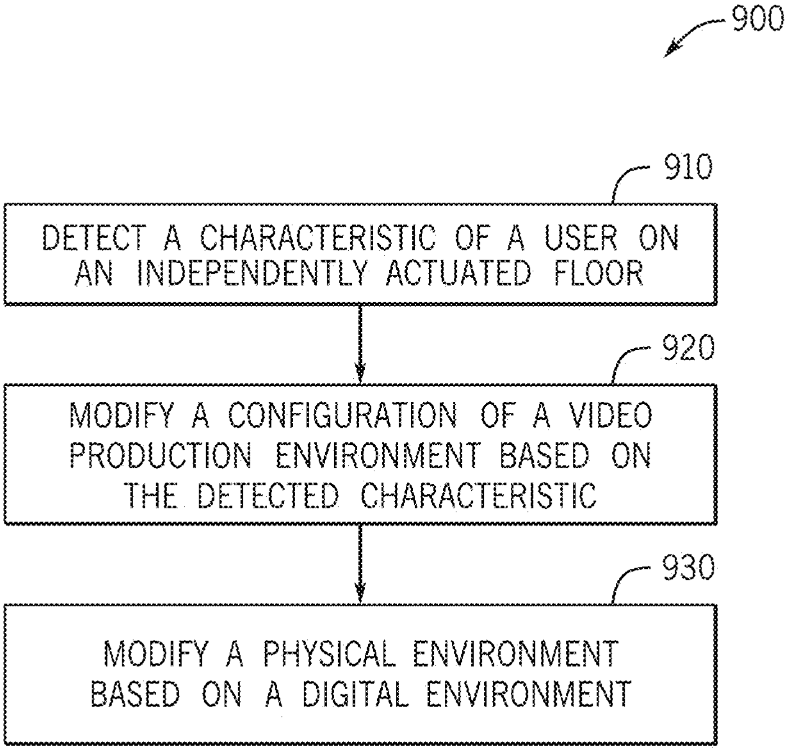
FIG. 9 illustrates a flow chart providing an example method of using a video production system.

Turning to FIG. 9, an example method 900 for video production as described herein is depicted. The method 90 may be implemented using the various systems described herein, such as the video production system 100 or the computing system 800 (e.g., the processor 808). At step 910, the method 900 includes detecting a characteristic of a user on an independently actuated floor (e.g., the modular floor 132). For example, the sensor 150 or multiple sensors may detect an orientation, position, or movement of one or more actors 120 on the modular floor 132, such as in a manner as described herein.

At step 920, the method 900 includes modifying a configuration of the video production environment 104 based on the detected user characteristic. The video production environment 104 may be modified in many ways, as described above. For example, an output of the screen 126 (e.g., the digital background 128) may be adjusted, such as to match the digital background 128 to the user's movements or position. In addition, or alternatively, the video production environment 104 may be adjusted by the modular floor 132, such as to align cameras and one or more props 112 to the digital background 128, such as moving the cameras or props 112 to desired positions on the stage 106. Additionally, or alternatively, the actor(s) 120 themselves may be moved into desired position, such as to align the actor(s) 120 to the digital background 128.

At step 930, the method 900 includes modifying a physical environment based on a digital environment. For example, the modular floor 132 may be adjusted, such as to move the actor 120 or props 112 to a desired position, based on an output of the screen 126, such as to match, correspond to, or complement the digital background 128. In this manner, either the modular floor 132 or the filming backdrop (e.g., screen 126 or digital background 128) may change based on the other.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A video production system comprising:

a video production environment defining a physical environment and a digital environment both viewable by a plurality of users positioned in the physical environment, wherein the physical environment comprises a display for displaying digital content of the digital environment;

a camera having a field of view;

a modular floor comprising a plurality of tiles configured to move independently to induce or respond to a motion of at least one user in contact with the modular floor; and a processor configured to:

modify a configuration of one of the video production environment or the modular floor based on a change of the other of the video production environment or the modular floor, and modify the configuration of the modular floor to move at least one of the camera or the at least one user to locate the at least one user to a position relative to the display within the field of view of the camera, wherein the position comprises a range of positions within a threshold distance from an exact location to define an area, such that the area allows the at least one user to move along the modular floor without modification of the modular floor.

2. The video production system of claim 1, further comprising a sensor configured to detect an orientation, position, or movement of the at least one user in contact with the modular floor, wherein the processor is configured to modify the configuration of the video production environment based on the detected orientation, position, or movement of the at least one user.

3. The video production system of claim 2, wherein the display is fixed in the physical environment to display the digital content to the plurality of users, wherein the processor is configured to adjust the digital content based on the detected orientation, position, or movement of the at least one user in contact with the modular floor.

4. The video production system of claim 1, wherein the video production environment comprises a stage, and wherein the modular floor defines at least a portion of the stage.

5. The video production system of claim 4, wherein the modular floor defines an infinitely adjustable path for the at least one user in contact with the stage.

6. The video production system of claim 1, wherein:

the physical environment comprises one or more props; and the processor is configured to modify the configuration of the modular floor to move the one or more props in alignment with the display within the field of view of the camera and based on a detected orientation, position, or movement of the at least one user.

7. The video production system of claim 1, wherein the processor is configured to modify the configuration of the modular floor based on the digital content displayed on the display.

8. The video production system of claim 1, wherein the modular floor is selectively actuated to adjust a walking surface for the at least one user.

9. A system comprising:

a video production environment comprising a camera having a field of view and a display, the camera and the display viewable by a plurality of users positioned in the video production environment;

a modular floor comprising a plurality of tiles configured to move independently to induce or respond to a motion of a user in contact with the modular floor;

a sensor configured to detect a characteristic of the user in contact with the modular floor; and a processor in communication with the sensor, wherein the processor is configured to;

modify a configuration of one of the video production environment or the modular floor based on a change of the other of the video production environment or the modular floor to define or maintain a scene for filming by the camera, and modify the configuration of the modular floor to move at least one of the camera or the user to locate the user to a position relative to the display within the field of view of the camera, wherein the position comprises a range of positions within a threshold distance from an exact location to define an area, such that the area allows the user to move along the modular floor without modification of the modular floor.

10. The system of claim 9, wherein the detected characteristic of the user comprises at least one of an orientation, a position, or a movement of the user in contact with the modular floor, and wherein the processor is configured to modify at least one of the camera or the display based on the detected characteristic of the user.

11. The system of claim 9, wherein the modular floor defines at least a portion of a stage, and wherein the processor is configured to modify the stage based on an output of the display.

12. The system of claim 9, wherein the video production environment defines a physical environment and a digital environment, wherein the physical environment is a same physical space for the plurality of users, and wherein the processor is configured to modify the video production environment to align the physical environment and the digital environment for video production.

13. The system of claim 9, wherein the modular floor is configured to move at least one of the camera, one or more props, or the user, relative to the display, to align the one or props, the user, and the display within the field of view of the camera.

14. The system of claim 9, wherein the sensor is configured to track the user relative to the camera.

15. A video production system comprising:

a video production environment comprising a camera having a field of view, a stage, and a display, the display configured to provide a digital background for simultaneous viewing by a plurality of users positioned in the video production environment;

a modular floor defining at least a portion of the stage, the modular floor comprising a plurality of tiles configured to move independently to induce or respond to a motion of at least one user in contact with the modular floor;

a sensor configured to detect an orientation, a position, or a movement of the at least one user on the modular floor; and a processor configured to:

modify a configuration of the video production environment based on the detected orientation, position, or movement of the at least one user to align the camera and the at least one user to the digital background for video production; and modify a configuration of the modular floor to move at least one of the camera or the at least one user to locate the at least one user to a position relative to the display within the field of view of the camera, wherein the position comprises a range of positions within a threshold distance from an exact location to define an area, such that the area allows the at least one user to move along the modular floor without modification of the modular floor.

16. The video production system of claim 15, wherein the video production environment defines a physical environment and a digital environment, wherein the digital environment comprises the digital background, and wherein the processor is configured to modify the configuration of the video production environment to align the physical environment and the digital environment.

17. The video production system of claim 15, wherein the modular floor is configured to move the camera and the at least one user independently on the stage to align the camera and the at least one user relative to the display.

18. The video production system of claim 15, wherein the modular floor is configured to position the at least one user and one or more props on the stage.

* * * * *